Patented Oct. 21, 1952

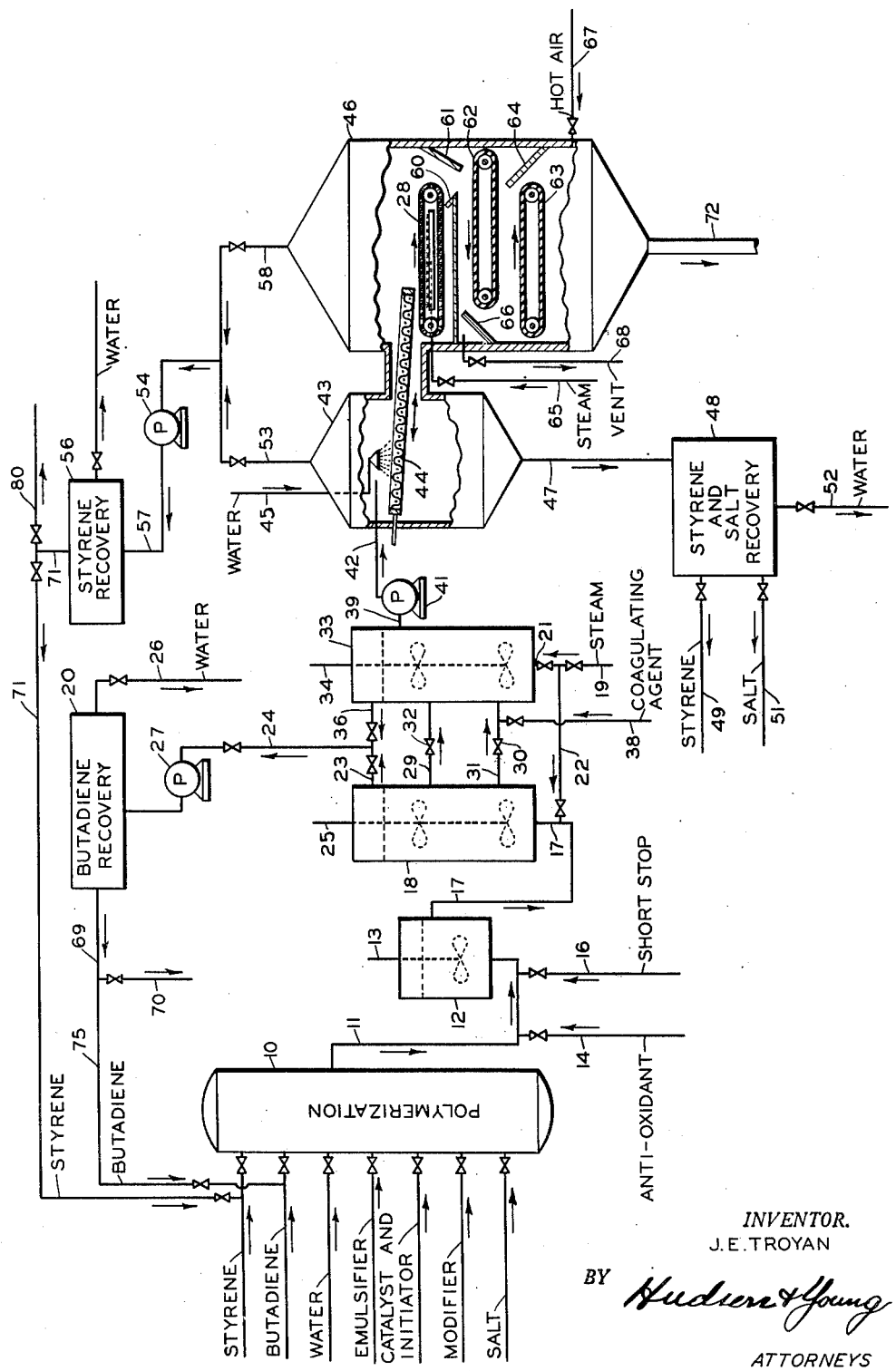

2,615,010

UNITED STATES PATENT OFFICE 2,615,010

RECOVERY OF RUBBERLIKE POLYMER FROM A LATEX

James E. Troyan, Lewiston, N. Y., assignor to Phillips Petroleum Company, a corporation of Delaware Application December 16, 1949, Serial No. 133,303

14 Claims. (Cl. 260—85.1)

This invention relates to the production of synthetic rubber. In one embodiment this invention relates to the separation and recovery of rubbery polymer product, salt, and unreacted monomeric reactants, present in effluents of a process for producing rubber. In still another embodiment this invention relates to the separation and recovery of monomers, and rubbery polymer product from a latex formed from a low-temperature emulsion polymerization recipe employing an electrolyte as an anti-freeze agent.

Recent developments in the field of emulsion polymerization have shown that elastomers produced at low temperatures are superior to those produced at higher temperatures, particularly as regards such properties as tensile strength, hysteresis, tack, flex life, resistance to abrasion, and the like. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type recipe the peroxide or hydroperoxide is the oxidant. The oxidation catalyst is generally selected from a group of materials consisting of compounds of metals such as iron, manganese, copper, vanadium, cobalt, etc. The reductant is usually an organic material such as a reducing sugar or other easily oxidizable compound, e. g. glucose, levulose, sorbose, invert sugar, other aldoses and ketoses, and the like. Oxidants include such compounds as hydrogen peroxide, a pernitrate, a persulfate, a permanganate, or the like; or an organic peroxide such as benzoyl peroxide, or an organic hydroperoxide such as tertiary butyl hydroperoxide, methyl cyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all these recipes it is usually desirable to include a modifier, such as a mercaptan, an emulsifying agent such as a soap, or other known emulsifying agents, and various other ingredients which improve the quality of the resulting latex or of the final rubber product.

When carrying out emulsion polymerization reactions at low temperatures it is necessary that a reaction medium be employed which will remain fluid throughout the reaction period. When it is desired to effect polymerizations at temperatures near or below 0° C., systems comprising aqueous solutions containing substantial amounts of organic materials such as alcohols, for example methanol, glycerol, glycol, and the like can be employed. Also, it has been found, as disclosed in the copending application of W. M. St. John, Jr., and C. A. Uraneck, Serial No. 88,232, filed April 18, 1949, that inexpensive electrolyte materials such as common salt, i. e. sodium chloride, and various other salts can be used as solutes in the aqueous medium to suppress its freezing point. Water-salt solutions employed in this manner are referred to herein as "high-salt aqueous media." Emulsion polymerization recipes employing freezing point depressants, such as an electrolyte of the type more fully discussed hereafter, to form a high-salt aqueous medium, for maintaining a fluid polymerization system at temperatures near or below 0° C. are referred to herein as "low-temperature emulsion polymerization recipes."

When employing conventional emulsion polymerization recipes, i. e., recipes in which a high-salt aqueous medium is not employed, the resulting latex product is freed of all unreacted monomeric reactants generally by steam stripping and is thereafter coagulated by addition thereto of a conventional coagulating agent such as brine, mineral acid, brine-mineral acid, brine-alcohol, or the like. Operating in this manner, unreacted monomer materials and a rubbery polymer product free from monomers as impurities are economically separated and recovered.

However, when employing low temperature high-salt aqueous emulsion polymerization recipes, the conventional steam stripping techniques discussed above cannot be employed. Instead, when heating latex product of these recipes, a substantial amount of coagulation takes place, concomitantly resulting in the formation of lumps of polymer in which monomeric materials as impurities are dissolved and/or occluded. While any unreacted lower boiling monomers, such as conjugated dienes, e. g. 1,3-butadiene, isoprene, chloroprene, and the like, may be removed more or less readily, any higher boiling unreacted monomers, such as styrene, various substituted styrenes, and the like, remain in the polymer rendering it sticky and somewhat difficult to handle, or relatively hard and inelastic, depending on the specific monomeric impurity present. Even prolonged steam stripping of the slurry carried out under conventional conditions for removal of unreacted styrene and similar comonomers from an uncoagulated latex does not effect satisfactory removal of these materials from such salt-antifreeze emulsion polymerization systems. Conventional steam stripping procedures, therefore, cannot be satisfactorily utilized in the recovery of unreacted monomeric reactant materials, and coagulated latices free of such materials, when employing salt-anti-freeze emulsion polymerization recipes.

My invention is concerned with the removal of unreacted monomers and recovery of rubbery polymer product free of monomers as impurities, from a latex formed from a low-temperature emulsion polymerization recipe employing a high-salt aqueous medium.

An object of this invention is to provide an improved process for the manufacture of synthetic rubber.

Another object is to provide for the separation and recovery of unreacted monomeric reactant materials from a latex product of a low-temperature emulsion polymerization employing an electrolyte as an anti-freeze agent.

Another object is to provide for the coagulation of a latex formed as a product of a low-temperature emulsion polymerization employing an electrolyte as an anti-freeze agent, and for recovery of unreacted monomeric reactants from the resulting coagulum.

Still another object is to provide for the separation and recovery of salt and unreacted monomers from a latex formed from a low-temperature emulsion polymerization recipe employing a salt as an anti-freeze agent.

It is yet another object to provide for the recovery of rubbery polymer free from monomer impurities, from a latex formed from an aqueous emulsion polymerization recipe employing as an aqueous medium an aqueous solution of an electrolyte of the type discussed hereinabove.

Other objects will be apparent to those skilled in the art from the accompanying discussion and disclosure.

My invention provides for the separation and recovery of monomers and rubbery polymer product free from monomers, from a latex containing unreacted monomer reactant materials, and formed from an aqueous emulsion polymerization recipe utilizing as the aqueous medium an aqueous solution of an electrolyte of the type discussed above, and providing for the formation of linear copolymers of high molecular weight by addition copolymerization of a monomeric conjugated diene having from 4 to 6 carbon atoms in the molecule, with a monomer copolymerizable therewith, having a boiling point within the limits of 75–200° C. and containing the structure $CH_2=C<$.

In a broad embodiment, the latex is completely coagulated while at the same time all the unreacted diene therein is evolved as a vapor and withdrawn. During the time that the latex is coagulated and the diene withdrawn, other monomeric materials present in the latex inherently become occluded and/or dissolved in the solid rubbery product particles of the resulting coagulum. Rubbery polymer product free of such occluded or dissolved monomers is recovered from the diene-free coagulum by removing the serum therefrom, generally by filtration, and then stripping the residual rubbery product free of the occluded and/or dissolved monomers associated therewith.

Any electrolyte can be used to produce high-salt aqueous media which functions satisfactorily as a freezing point depressant and does not markedly inhibit polymerization, or produce deleterious effects on the latex or final rubber product. Since lower temperatures can be obtained with some salts than with others, the choice of the salt employed is frequently determined by the temperature at which polymerization is to take place. In other instances where a number of salts might be found applicable, the choice is governed by other factors, such as the polymerization recipe employed, the effects produced by a particular electrolyte, etc. Materials ordinarily used are alkali and alkaline earth metal salts, and salts of ammonium which are of sufficient solubility at low temperatures to give an aqueous medium of the freezing point desired. Chlorides, nitrates, and sulfates of these metals are most frequently preferred, particularly the chlorides of sodium, potassium, calcium, magnesium, and ammonium. Highly soluble salts of organic acids of low molecular weight can also be used, such as salts of formic, acetic, propionic and butyric acids, and especially the potassium salts.

The amount of salt employed in the preparation of a high-salt aqueous medium is variable and is determined by the salt chosen and by other factors, such as the operating temperature and the polymerization recipe. In general the concentration of salt should be such that the freezing point of the aqueous medium is lower than the temperature of the heat exchange medium used to remove the heat of reaction, so that freezing will not take place when the emulsion is in contact with colder heat-exchange equipment, which will usually be below the freezing point of water. Some salts tend to have some inhibiting effects with some recipes but not with others, and at very low temperatures some salts will not be sufficiently soluble to be present in high enough concentration. Based upon the weight of water, the amount of salt will usually be at least from 4 to 5 per cent and will not exceed 30 per cent, and usually it will not be greater than 25 per cent. In some instances, of course, the solubility of a salt will not permit a concentration as high as 25 per cent and in other cases, regardless of solubility, the desired effects are produced with solutions of lower concentration.

Emulsifying agents which are applicable when employing electrolytes as freezing point depressants, as already discussed, are those which will remain soluble and perform the function of surface active agents in the concentration of salt chosen, i. e. in the high-salt aqueous medium employed. Both anionic and nonionic types of emulsifying agents are suitable. Anionic emulsifiers include such compounds as soluble salts of the short chain or low molecular weight organic acids, i. e. those containing 6 to 10 carbon atoms per molecule, as sodium salts of capric acid, caprylic acid, caproic acid, sodium hexyl sulfate, and the like. Examples of nonionic emulsifiers include alkylated aryl polyether alcohols, sorbitan monolaurate, sorbitan monopalmitate, sorbitan monooleate, lecithin, and other materials which behave in a similar manner. The amount of emulsifying agent will generally be between about 1 to about 10 parts by weight, per 100 parts of monomeric material.

The monomeric materials polymerized by aqueous emulsion recipes employing electrolytes as freezing point depressants, by the process of the present invention comprise at least one low-boiling and one high-boiling unsaturated organic compound which undergo an addition polymerization in aqueous emulsion to form linear polymers of high molecular weight, and which generally contain the characteristic structure $CH_2=C<$ and also, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in the low-boiling class of monomers are the conjugated butadienes, or 1,3-butadienes, having not more than six carbon atoms per molecule, such as butadiene (1,3-butadiene), 2,3-dimethyl-1,3-butadiene, isoprene, piperylene, and the like; haloprenes, such as chloroprene (2-chloro-1,3-butadiene), bromoprene, methylchloroprene (2-chloro-3-methyl-1,3-butadiene), and the like. High-boiling compounds include aryl olefins such as styrene, various alkyl styrenes, p-chlorostyrene, p-methoxystyrene, alpha-methylstyrene, and the like; acrylic acid, acrylonitrile, and the like.

In conducting an emulsion polymerization in the presence of electrolytes, in the manner above discussed, it is preferred that the emulsion be of an "oil-in-water" type, with the ratio of aqueous medium to monomeric material between about 0.5:1 and about 2.75:1, in parts by weight.

The temperature at which low temperature polymerizations of the type discussed herein are carried out is usually below about 5° C. In general, it is found that the lower the polymerization temperature the better the characteristics of the resulting synthetic rubber product, providing that the recipe is sufficiently active to produce a sufficient extent of conversion within a permissible reaction time. It will not usually be feasible to conduct reactions below about −40° C. and satisfactory operation is more usually obtained between about −20 and 0° C.

In a preferred embodiment, a latex formed from a low-temperature emulsion polymerization recipe of the type discussed above, is coagulated upon being heated at a temperature generally within the limits of 55–135° F. for a time of from about 1.5 to 5 hours, under a pressure as low as 50 mm. Hg or less and generally not higher than from atmospheric pressure to about 2 atmospheres, while at the same time unreacted low-boiling diene reactants therein are evolved as vapors, and withdrawn; serum, i. e. the liquid material remaining after coagulation of the latex, is separated from the resulting coagulum by filtration, and residual rubbery polymer is washed and then stripped free of occluded and/or dissolved higher-boiling monomer impurities, and dried. Rubbery polymer product free of monomer impurities is recovered as a product of the process.

In the practice of one form of my preferred embodiment, I conduct the coagulation of the latex and withdrawal of diene monomer in two steps. In a first step I heat the latex to a temperature within the limits of 55–85° F., for a period of from 0.5 to 2 hours at a pressure generally from about 300 mm. Hg to 2 atmospheres. The heating is effected by passing live steam into the liquid latex. In this step at least a major proportion of the latex is coagulated and generally the larger proportion of diene monomeric reactant, unreacted in the polymerization step and present in the latex, is evolved as vapor from the slurry. In a second step I heat slurry produced in the first step to a temperature above that employed in the first step and at a lower pressure. Generally the temperature employed in this second step is within the limits of 110–135° F., and heating is maintained for a time generally from about 1 to about 3 hours at a pressure within the limits of about 50–300 mm. Hg. Heating is conducted by passing live steam into the slurry. Under these relatively severe conditions in the second step, diene monomeric materials present in the slurry are evolved therefrom as vapors, and withdrawn. By means of these combined steps the latex is maintained under temperature and pressure conditions of minimum severity, and coagulation is complete and substantially the last traces of diene monomeric reactants are evolved and withdrawn from the slurry.

In my preferred embodiment, after the serum is withdrawn from the slurry of the second step, residual rubbery polymer product, often referred to as coagulum, or rubber crumb, is heated to a temperature within the limits of about 175–250° F. while passing stripping gas in contact therewith under which conditions the exit flowing stripping gas carries with it high-boiling monomer materials formerly occluded and/or dissolved in the rubbery product particles, to provide a stripped polymer product free of monomer impurities. Steam and/or hot air is generally employed as the stripping gas, serving also as the heat source. The rubber-like product freed of monomer is then dried in any suitable manner, generally while in contact with a steam of hot drying air at a temperature generally within the the range of 160–180° F., and recovered. The process of this invention is applicable to any latex produced from a low-temperature emulsion polymerization recipe of the type above described.

Although as can be readily deduced from the foregoing, this invention is applied to latices produced from a host of possible monomer reactants, the most readily and commercially available monomers at present are butadiene itself (1,3-butadiene) and styrene. This invention will therefore be more particularly discussed hereafter with reference to latices produced from these typical reactants. In the emulsion polymerization of these monomers, it is usually preferred to use them together, in relative ratios of butadiene to styrene between about 65:35 and 90:10 by weight. One method of operating the process of my invention will be specifically disclosed with reference to the accompanying figure, which is a diagrammatic flow sheet, illustrating a specific embodiment of my invention as applied to a latex formed from 1,3-butadiene and styrene. It is to be understood that this diagrammatic flow sheet can be altered in many respects by those skilled in the art and yet remain within the intended scope of my invention.

Referring to the figure, butadiene and styrene along with water, a salt, such as sodium chloride, a catalyst and initiator, an emulsifier, and a modifier, are charged to a polymerization zone 10 wherein butadiene and styrene are copolymerized at a low temperature, i. e. a temperature below 41° F. and more preferably below 32° F. and as low as —40° F. Concentrations of salt in the emulsion polymerization reaction mixture in zone 10, are below 30 weight per cent, based on the water therein, and more generally within the limits of from 4 to 20 weight per cent.

Polymerization is allowed to proceed in zone 10, to 55 to 90 per cent, usually 60–65 per cent conversion, based on the parts by weight of monomeric material charged. Latex containing some unreacted butadiene and styrene is withdrawn from polymerization zone 10 through line 11 into mixing zone 12 where it is mixed by means of stirrer 13 with an antioxidant introduced through line 14, such as phenyl-beta-naphthylamine, and/or a suitable shortstopping agent introduced through line 16. Suitable shortstop agents introduced into zone 12 include hydroquinone, ditertiarybutylhydroquinone and dinitrochlorobenzene. Suitable antioxidants introduced into zone 12 in addition to phenyl-beta-naphthylamine, include hydroquinone monobenzylether, mono- and di-heptyl amines, and aldol-alpha-naphthyl amine. Product in mixing zone 12 is withdrawn through line 17 and passed into zone 18 wherein a major proportion of the latex, formed in zone 10, is coagulated and at least a major proportion of any unreacted butadiene present therein is evolved as vapor. Latex in zone 18 is coagulated by passing steam from lines 19, 22, and 17 thereinto at a rate and at a temperature to maintain the latex in zone 18 at a temperature within the limits of 55–85° F., more preferably 65–75° F., and at a pressure within the limits of 300 mm. Hg to about two atmospheres. Under these conditions in zone 18 a major proportion of polymer therein is coagulated and a major proportion of unreacted butadiene therein is vaporized. Butadiene vapors are withdrawn over head from zone 18, together with small amounts of water, through lines 23 and 24 to butadiene recovery zone 26. Pump 27 is located in line 24 to facilitate withdrawal of butadiene from zone 18 and transfer of same into zone 26. The residence time of latex in zone 18 is sufficiently great to permit at least a major proportion of the butadiene in contact therewith to be evolved, as vapor, for withdrawal through line 23, and is generally within the limits of 0.5 to 2 hours. Slurry in zone 18 is maintained in a constant state of agitation by stirring means 25, and is withdrawn from zone 18 through lines 29 and 31, these lines being disposed so as to be in communication with the upper portion and with the lower portion of the liquid body in zone 18, respectively, providing thereby for withdrawal of slurry of over-all uniform composition from zone 18. Flow of liquid through lines 29 and 31 is controlled through valves 32 and 30, and directed into zone 33. Slurry in zone 33 is maintained at a pressure below that in zone 18, preferably within the limits of 50–300 mm. Hg, and at a higher temperature, generally within the limits of 110–135° F. Agitation is maintained in zone 33 by means of stirrer 34. In zone 33, slurry is heated at a higher temperature and at a lower pressure than employed in zone 18, whereby substantially the last traces of unreacted butadiene are evolved as vapor from the slurry and uncoagulated latex therein, is coagulated. Vaporous butadiene evolved in zone 33 is withdrawn through line 36 and passed to butadiene recovery zone 26 through line 24. Heating is generally effected in zone 33 by passing steam thereinto through lines 19 and 21 at a temperature and a rate to maintain the desired temperature. The desired low pressure is maintained in zone 33 by means of vacuum pump 27 disposed in line 24. The degree to which coagulation is complete in zone 18 is dependent upon the specific latex being treated, i. e. particularly with regard to the recipe employed. In some instances coagulation in zone 33 may be incomplete, in which case it is advisable to add a coagulating agent such as a brine-alcohol solution, or a mineral acid, to the liquid therein, which can be done by introduction of same through lines 38 and 31. Hydrochloric acid and sulfuric acid are particularly well suited as coagulating agents in zone 33. Another variable that will determine advisability of adding an acid is the choice of emulsifying agent employed in zone 10. In cases wherein ionic emulsifiers of the type discussed hereinbefore are used, the addition of a coagulating agent is frequently considered advantageous, while in other cases such as where nonionic emulsifiers are used, satisfactory operation may be effected without the addition of acid.

Slurry substantially butadiene-free is withdrawn from zone 33 through line 39 by means of liquid pump 41 and discharged through line 42 into separating zone 43 wherein the slurry is passed on to vibrating screen 44 and the coagulum thereby separated from the serum which is passed through screen 44 into the lower portion of zone 43. A spray of water introduced from line 45 is directed in contact with separated rubbery polymer product on hte surface of screen 44 to aid in the removal of serum therefrom and to wash it free of any acid or salt still in contact therewith. Serum containing a minor portion of styrene is removed from the lower portion of zone 43 through line 47 and is discharged into styrene and salt recovery zone 48. Water, salt, and styrene in zone 48 can each be separated from the other in any suitable manner if desired, in which case styrene is withdrawn through line 49, salt through line 51 and water through line 52. Any uncondensed vapors in zone 43 are withdrawn through line 53 through pump or blower 54 and discharged to styrene recovery zone 56 through line 57.

Residual rubbery polymer product, or crumb, containing occluded and/or dissolved styrene is passed from the top of screen 44 into stripping-drying section 46, wherein it is transferred onto perforate conveyor 28. The polymer crumb on conveyor 28 is stripped of occluded and/or dissolved styrene, upon being heated in contact with steam and/or hot air which is introduced into zone 46 through line 65 and passed upwardly through the perforate openings in conveyor 28. Stripping temperature in section 46 is maintained in the range of 175–250° F. Hot vapors passed through conveyor 28, and carrying styrene stripped from the rubber crumb thereon, are withdrawn from zone 46 through line 58 and pump 54, and discharged into styrene recovery zone 56. Steel plate 60 is disposed in zone 46, below conveyor 28 so as to direct the flow of steam from line 65 in an upward direction through conveyor 28. In this manner unreacted styrene initially associated with coagulum in zones 18 and 33, is efficiently and economically removed from the polymer product, to provide synthetic rubber comparable to that recovered from latex formed in accordance with conventional emulsion polymerization recipes.

Polymer crumb is transferred from conveyor 28 by gravity to subjacently disposed conveyor-dryers 62 and 63, and maintained at a temperature generally in the range of from 160–180° F. The crumb supported on these conveyors is dried by passing hot air introduced from line 67 in contact therewith at the 160–180° F. drying temperature. It is to be understood that although two conveyors are illustrated, i. e. conveyors 62 and 63, a larger number of such conveyors can be employed if desired. In order to minimize air leakage from the drying to the stripping section, i. e. from the lower portion into the upper portion of zone 46, baffles 64, 66 and 61 are disposed each in a position to direct the larger proportion of hot air flow from line 67 so that it first moves in a direction away from baffle 64 below conveyor 63, then in a reverse direction along a path intermediate conveyors 62 and 63 and finally along the upper side of conveyor 62 toward baffle 66. Drying air is withdrawn from zone 46 through vent line 68. Line 67 and vent line 68 are for these reasons disposed at selected points in order to facilitate such a flow of hot gas over the conveyors 62 and 63 in the lower portion of zone 46.

Butadiene and some water introduced into zone 20 are sepaarted therein by any suitable means. Butadiene thus separated in zone 20 is withdrawn through lines 69 and 70 or recycled to polymerization zone 10 through lines 69 and 75. Obviously, small amounts of styrene may be present in the material introduced into zone 20, and in that case styrene may be withdrawn from zone 20 and recycled with butadiene to zone 10 without any necessity for separating these two monomers.

Similarly, styrene and water introduced through line 57 into zone 56 can be separated therein by any suitable means, and styrene thus recovered can be withdrawn through lines 71 and 80 or recycled through line 71 to polymerization zone 10. Synthetic rubber of desired quality and free from monomeric materials is withdrawn from zone 46 through line 72.

In another embodiment of my invention the use of pump 41 can be dispensed with by operating zones 33, 43, and 46 under the same pressure.

In another embodiment of my invention zone 33 can be disposed at a high level with respect to zone 18, so that lines 29 and 31 each serve as liquid seals, eliminating thereby the need for control valves 32 and 30.

In order to render the schematic illustration of Fig. 1 in a simplified form, various pumps, valves, lines, etc. have not been shown in the drawing. However, pumps 27, 41 and 54 have been shown and discussed in order to more clearly exemplify one means by which various pressure and flow conditions in the process of my invention can be regulated. Obviously there are other means known to those skilled in the art, than those illustrated herein, for varying flow and pressure conditions in such a process system, and it is to be understood that the specific pump arrangements illustrated herein are not to be limiting in any way.

Advantages of this invention are illustrated by the following example. The reactants and their proportions and other specific ingredients are presented as being typical and should not be construed to limit the invention unduly.

*Example*

Copolymerization of butadiene with styrene in an aqueous medium containing sodium chloride and using a salt of a low molecular weight fatty acid as the emulsifying agent is carried out in accordance with the following recipe:

| | Parts by weight |
|---|---|
| Butadiene | 70 |
| Styrene | 30 |
| Water | 200 |
| Sodium chloride | 34.7 |
| Potassium caprylate | 10.0 |
| Cumene hydroperoxide, 100% | 0.167 (1.1 millimols) |
| Ferrous sulfate, $FeSO_4.7H_2O$ | 0.278 (1.0 millimol) |
| Sodium pyrophosphate, $Na_4P_2O_7.10H_2O$ | 0.446 (1.0 millimol) |
| Mercaptan blend [1] | 0.25 |

[1] A blend of tertiary $C_{12}$, $C_{14}$, and $C_{16}$ aliphatic mercaptans in a ratio of 3 : 1 : 1 parts by weight.

After completion of the polymerization period the reaction mixture is shortstopped by the addition of 2.0 parts of ditertiarybutylhydroquinone and stabilized against oxidation by the addition of 1.5 parts of phenyl-beta-naphthyl amine. The cold latex is transferred to a vessel wherein live steam is introduced to heat the latex to about 80° F. During this time butadiene is evolved from the mixture as a vapor and is withdrawn, and substantially all the rubber in the latex is coagulated because of the effects of diluent and heat. Heating and withdrawal of butadiene above described is completed in about 1 hour. The resulting slurry is then transferred to another vessel where it is heated with live steam to a maximum final temperature of about 120° F. and is evacuated to a final pressure of about 100 mm. Hg absolute. This step requires about 1.5 hours. The slurry at this point contains no uncoagulated polymer, substantially no residual butadiene, but substantially all the residual unreacted styrene, and is transferred onto an enclosed vibrating screen, where serum is separated from the coagulum. The residual crumb on the vibrating screen is washed with water in a proportion of about 0.5–1.0 pound of water per pound of rubber. These water washings are collected with the serum and are stored for further treatment and use in subsequent operations. The washed crumb contains most of the styrene initially occluded and/or dissolved therein, and is passed from the vibrating screen onto a continuous perforate belt type conveyor where it is heated in contact with live stem at a temperature of about 240° F. The steam is passed upwardly through the perforate belt, serving to strip styrene free from the crumb. A Nash-type pump is disposed to pull vapors of styrene and water from the stripping operation and to deliver that stream to a condenser and recovery zone. Rubber polymer or crumb, stripped free of occluded and/or dissolved styrene is passed to a conventional continuous belt type dryer and passed in contact with hot air at a temperature of about 170° F. whereby it undergoes final drying. The dried rubbery polymer product is free from styrene, and is recovered as a product of the process.

As will be evident to those skilled in the art, various modifications of this invention can be made, or followed, in the light of the foregoing disclosure and discussion, without departing from the spirit or scope of the disclosure or from the scope of the claims.

I claim:

1. In a process for the separation of unreacted monomers from a latex to recover therefrom a solid rubbery polymer free from monomeric materials, said latex having been formed from an aqueous emulsion polymerization recipe utilizing as the aqueous medium of said emulsion an aqueous solution of a salt of a cation of the group consisting of ammonium, alkali metals, and alkaline earth metals and of an anion of the group consisting of inorganic anions and of formic, acetic, propionic, and butyric acids containing said salt in an amount within the limits of 4 to 30 per cent by weight of water in said solution, and providing for addition copolymerization of a monomeric conjugated diene having from 4 to 6 carbon atoms in the molecule with a monomer copolymerizable therewith, having a boiling point within the limits of 75–200° C., and containing the structure $CH_2=C<$, to form a linear copolymer of high molecular weight, the improvement comprising heating said latex at a temperature within the limits of 55 to 135° F. at a pressure within the limits of 50 mm. Hg to two atmospheres for a period of from 0.5 to 5 hours, whereby unreacted conjugated diene present in said latex is completely evolved therefrom as vapor, said latex is concomitantly coagulated, and solid particles of the resulting slurry contain an unreacted portion of said monomer copolymerizable with said diene; separating serum from said slurry; and heating resulting residual coagulum at a temperature within the limits of 175–250° F. while simultaneously passing a stripping gas therethrough, said stripping gas being chemically inert to said residual coagulum whereby monomer is stripped from said coagulum and is carried therefrom in off-gas from said stripping.

2. In a process for the separation of unreacted monomers from a latex to recover therefrom as latex a solid rubbery polymer free from monomeric materials, said latex having been formed from an aqueous emulsion polymerization recipe utilizing as the aqueous medium of said emulsion an aqueous solution of a salt of a cation of the group consisting of ammonium, alkali metals, and alkaline earth metals and of an anion of the group consisting of inorganic anions and of formic, acetic, propionic, and butyric acids containing said salt in an amount within the limits of 4 to 30 per cent by weight of water in said solution, and providing for addition copolymerization of a monomeric conjugated diene having from 4 to 6 carbon atoms in the molecule with a monomer copolymerizable therewith, having a boiling point within the limits of 75–200° C., and containing the structure $CH_2=C<$, to form a linear copolymer of high molecular weight, the improvement comprising heating said latex in a first heating step at a temperature within the limits of 55–85° F. at a pressure of from 300 mm. Hg to 2 atmospheres for a time of from 0.5–2 hours, whereby a major proportion of said diene reactant material in said latex is evolved as a vapor and a major proportion of said latex is coagulated; in a second heating step heating slurry formed during said first heating step at a temperature within the limits of 110–135° F., for a period of from 1–3 hours and under a pressure of from 50–300 mm. Hg, whereby dienes therein are evolved as vapors and uncoagulated latex therein is coagulated; said polymer particles in total slurry formed during said heating steps containing unreacted portions of said monomer copolymerizable with said diene; separating serum from said total slurry; and heating resulting residual polymer at a temperature within the limits of 175–250° F. while simultaneously passing a stripping gas therethrough, said stripping gas being chemically inert to said residual polymer, whereby monomer is stripped from said residual polymer and is carried therefrom in off-gas from said stripping.

3. In a process for the separation of unreacted 1,3-butadiene and styrene monomers from a latex to recover therefrom a solid rubbery polymer free from said monomers, said latex having been formed from an aqueous emulsion polymerization recipe utilizing as the aqueous medium of said emulsion an aqueous solution of a salt of a cation of the group consisting of ammonium, alkali metals, and alkaline earth metals and of an anion of the group consisting of inorganic anions and of formic, acetic, propionic, and butyric acids containing said salt in an amount within the limits of 4 to 30 per cent by weight of water in said solution, and providing for addition copolymerization of said butadiene with said styrene to form a linear copolymer of high molecular weight, the improvement comprising heating said latex at a temperature within the limits of 55–135° F. at a pressure within the limits of 50 mm. Hg to 2 atmospheres for a period of from 1.5–5 hours whereby unreacted butadiene present in said latex is completely evolved therefrom as vapor, said latex is concomitantly coagulated, and solid particles of the resulting slurry contain unreacted portions of styrene; withdrawing vaporous butadiene from said slurry; separating serum from said slurry; and heating resulting residual polymer at a temperature within the limits of 175–250° F. while simultaneously passing a stripping gas therethrough, said stripping gas being chemically inert to said residual polymer whereby styrene is stripped from said residual polymer and is carried therefrom in off-gas from said stripping.

4. In a process for the separation of unreacted 1,3-butadiene and styrene monomers from a latex to recover therefrom a solid rubbery polymer free from said monomers, said latex having been formed from an aqueous emulsion polymerization recipe utilizing as the aqueous medium of said emulsion an aqueous solution of a salt of a cation of the group consisting of ammonium, alkali metals, and alkaline earth metals and of an anion of the group consisting of inorganic anions and of formic, acetic, propionic, and butyric acids containing said salt in an amount within the limits of 4 to 30 weight per cent of water in said solution, and providing for addition copolymerization of said butadiene with said styrene to form a linear copolymer of high molecular weight, the improvement comprising heating said latex in a first heating step at a temperature within the limits of 55–85° F. and at a pressure of from 300 mm. Hg. to 2 atmospheres for a duration of from 0.5–2 hours, whereby a major proportion of said butadiene in said latex is evolved as vapor and a major proportion of said latex is coagulated; withdrawing vaporous butadiene from said latex while heating same during said first heating step; in a second heating step heating slurry formed during said first heating at a temperature within the limits of 110–135° F., for a duration of from 1–3 hours under a pressure of from 50–300 mm. Hg, whereby butadiene therein is evolved as vapor and uncoagulated latex is coagulated; solid particles in total slurry formed during said heating steps containing unreacted portions of said styrene; withdrawing vaporous butadiene from slurry during said second heating step; separating serum from said total slurry; heating resulting residual polymer at a temperature within the limits of 175–250° F. while simultaneously passing a stripping gas therethrough; said stripping gas being chemically inert to said residual polymer whereby styrene is stripped from said polymer and is carried therefrom in off-gas from said stripping, and recovering rubbery polymer free from butadiene and styrene as a product of the process.

5. The process of claim 4 wherein a coagulating agent is added to the slurry while it is being heated in said second heating step.

6. The process of claim 5 wherein said coagulating agent is a mineral acid.

7. In a process for the separation of unreacted monomers from a latex to recover from said latex a solid rubbery product free from monomeric materials, said latex having been formed from an aqueous emulsion polymerization recipe utilizing as an aqueous medium of said emulsion an aqueous solution of a salt of a cation of the group consisting of ammonium, alkali metals, and alkaline earth metals, and of an anion of the group consisting of inorganic anions, and of formic, acetic, propionic, and butyric acids containing said salt in an amount between 4 and 30 weight per cent of water in said solution, and providing for the addition copolymerization of a monomeric conjugated diene having from 4-6 carbon atoms in the molecule with a monomer copolymerizable therewith having a boiling point within the limits of 75-200° C., and containing the structure $CH_2=C<$ to form a linear copolymer of high molecular weight, the improvement comprising heating said latex at a temperature within the limits of 55-135° F. and at a pressure within the limits of 50 mm. Hg to 2 atmospheres for a duration of from 0.5-5 hours, whereby unreacted conjugated diene present in said latex is completely evolved therefrom as vapor, said latex is concomitantly coagulated, and solid particles of the resulting slurry contain an unreacted proportion of said monomer copolymerizable with said diene; separating serum from said slurry; and passing stripping gas through the residual coagulum at a temperature within the limits of 175-250° F., whereby monomer is stripped from said coagulum and is removed in off-gas from stripping thereof.

8. The process of claim 4 wherein latex in said first heating step is heated by passing live steam thereinto.

9. In a process for the separation of unreacted butadiene and styrene monomers from a latex to recover from said latex a solid rubbery polymer free from monomeric materials, said latex having been formed from an emulsion polymerization recipe utilizing as the aqueous medium of said emulsion an aqueous solution of an alkali metal chloride containing said chloride in an amount within the limits of 4 to 30 per cent by weight of water in said solution, and providing for addition copolymerization of said butadiene with said styrene to form a linear copolymer of high molecular weight, the improvement comprising passing latex from a polymerization employing an aqueous emulsion polymerization recipe of the type above described into a mixing zone and therein admixing same with an antioxidant and with a shortstop, passing the resulting mixture to a first heating zone and therein passing live steam in contact with said mixture to heat same at a temperature within the range of 55-85° F. for a period of from 0.5 to 2 hours under a pressure of from 300 mm. Hg to 2 atmospheres, whereby a major proportion of said butadiene in said latex is evolved as a vapor and a major proportion of said latex is coagulated; withdrawing vaporous butadiene from said latex while heating same in said first heating zone; passing resulting slurry from said first heating zone into a second heating zone and therein passing live steam in contact with said slurry to heat same at a temperature within the range of 110-135° F. for a period of from 1-3 hours under a pressure of from 50-300 mm. Hg whereby butadiene is evolved from said latex as vapor, during said heating in said second heating zone, introducing a coagulating agent into contact with slurry therein, whereby coagulation of uncoagulated latex is completed; solid particles of resulting total slurry containing unreacted portions of styrene; withdrawing vaporous butadiene from said total slurry during heating in said second heating zone, passing slurry from the zone of said second heating into a separation zone and therein separating serum from said total slurry by filtration; water washing residual rubbery filtration product; passing washed rubbery product into a stripping zone and therein contacting said product with a stream of live steam at a temperature within the limits of 175-250° F. whereby said rubbery product is stripped free of styrene; passing resulting stripped rubbery polymer in contact with dry air at a temperature within the range of 160-180° F. whereby said rubbery product is dried, and recovering said dried rubbery product.

10. The process of claim 4 wherein said salt is an inorganic chloride.

11. The process of claim 10 wherein said salt is sodium chloride.

12. The process of claim 4 wherein said salt is an organic salt.

13. The process of claim 12 wherein said salt is a potassium salt.

14. The process of claim 9 wherein said chloride is sodium chloride.

JAMES E. TROYAN.

REFERENCES CITED

The following references are of record in the file of this patent:

UNITED STATES PATENTS

| Number | Name | Date |
|---|---|---|
| 2,386,449 | Driesbach | Oct. 9, 1945 |
| 2,418,782 | Mark et al. | Apr. 8, 1947 |
| 2,433,060 | Ohsol et al. | Dec. 23, 1947 |
| 2,451,332 | Green | Oct. 12, 1948 |
| 2,465,363 | Faragher et al. | Mar. 29, 1949 |